United States Patent
Woo et al.

(10) Patent No.: US 9,346,941 B2
(45) Date of Patent: May 24, 2016

(54) POLYCARBONATE RESIN COMPOSITION HAVING IMPROVED APPEARANCE AND FLOWABILITY

(71) Applicant: Samsung SDI Co., Ltd., Yongin-si (KR)

(72) Inventors: Eun Taek Woo, Uiwang-si (KR); Jae Hyun Han, Uiwang-si (KR); Eric Arifin, Uiwang-si (KR); Jung Ki Kim, Uiwang-si (KR); Jong Cheol Lim, Uiwang-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/566,788

(22) Filed: Dec. 11, 2014

(65) Prior Publication Data

US 2015/0183958 A1     Jul. 2, 2015

(30) Foreign Application Priority Data

Dec. 27, 2013   (KR) ........................ 10-2013-0165123

(51) Int. Cl.
  *C08K 5/5399*   (2006.01)
  *C08K 7/14*     (2006.01)

(52) U.S. Cl.
  CPC ................. *C08K 5/5399* (2013.01); *C08K 7/14* (2013.01)

(58) Field of Classification Search
  CPC ...................................... C08K 5/5399
  USPC ........................................... 524/116
  See application file for complete search history.

(56) References Cited

U.S. PATENT DOCUMENTS 9,006,306 B2 * 4/2015 La Camera et al. ............ 522/174
2003/0040643 A1 * 2/2003 Nakano et al. .................. 564/16

FOREIGN PATENT DOCUMENTS

KR    10-2009-0018569 A    2/2009

* cited by examiner

*Primary Examiner* — Doris Lee

(74) *Attorney, Agent, or Firm* — Additon, Higgins & Pendleton, P.A.

(57) ABSTRACT

A polycarbonate resin composition includes a polycarbonate resin, an inorganic filler, and a Tg regulator and can have improved appearance and flowability. The polycarbonate resin composition can be used as exterior materials for electronic devices such as cellular phones.

8 Claims, 1 Drawing Sheet

POLYCARBONATE RESIN COMPOSITION HAVING IMPROVED APPEARANCE AND FLOWABILITY

CROSS-REFERENCE TO RELATED APPLICATIONS

This application claims priority under 35 U.S.C. §119 to Korean Patent Application No. 10-2013-0165123, filed on Dec. 27, 2013, in the Korean Intellectual Property Office, the disclosure of which is incorporated herein by reference in its entirety.

FIELD OF THE INVENTION

The following disclosure relates to a polycarbonate resin composition, and more particularly, to a polycarbonate resin composition that can have improved appearance and flowability and can be used as exterior materials of electronic devices such as cellular phones and the like.

BACKGROUND

An inorganic filler-reinforced thermoplastic resin can have high flexural strength to provide excellent rigidity and therefore has been used in the manufacture of various components for automobiles, electronic devices, and the like. However, when an inorganic filler is added to a thermoplastic resin, there can be various problems, such as decreased impact resistance. Thus, it can be difficult to use such materials in components which may be damaged by external shock. In addition, flowability can be remarkably deteriorated, and thus temperature at the time of injection-molding should be increased for effective molding.

Among the inorganic filler reinforced thermoplastic resins, a glass fiber-reinforced polycarbonate resin has advantages in that excellent moldability of the polycarbonate resin can be maintained and tensile and flexural strength may be improved. In particular, the resin can have excellent flexural modulus and thermal resistance to be appropriate for components enduring continuous load or heat. Thus, glass fiber-reinforced polycarbonate resins have been used as exterior materials of electronic devices such as cellular phones and the like.

However, although the glass fiber-reinforced polycarbonate resin can have excellent impact resistance as compared to other glass fiber-reinforced thermoplastic resins, after injection-molding, glass fibers can protrude from a surface to thereby deteriorate appearance. An additive can be used in order to prevent deterioration of the appearance and to improve flowability. Use of the additive, however, can decrease impact resistance.

Korean Patent Laid-Open Publication No. 10-2009-0018569 discloses a glass fiber-reinforced polycarbonate having excellent flowability and impact strength by adding a modified polyolefin thereto. However, the polycarbonate has problems in that improvement of flowability is still not sufficient, and an appearance of a molded article manufactured therefrom is deteriorated, such that additional processes such as blasting, and the like, are required.

SUMMARY

An embodiment of the present invention is directed to providing a polycarbonate resin composition that can have improved appearance and flowability. More specifically, the present invention provides a polycarbonate resin composition that can have improved appearance and flowability with minimal or no reduction of mechanical properties, by including a glass transition temperature regulator (hereinafter, referred to as a Tg regulator) containing phosphorus in a polycarbonate resin reinforced with an inorganic filler to thereby reduce a glass transition temperature (Tg).

In addition, another embodiment of the present invention is directed to providing a molded article manufactured by the polycarbonate resin composition.

In exemplary embodiments, the present invention provides a polycarbonate resin composition that can have improved appearance and flowability including: (A) a polycarbonate resin, (B) an inorganic filler, and (C) a Tg regulator including phosphorus.

The polycarbonate resin composition may include (A) the polycarbonate resin in an amount of about 50 to about 85 wt %, the inorganic filler (B) in an amount of about 10 to about 40 wt %, and the Tg regulator including phosphorus in an amount of about 1 to about 10 wt %.

The polycarbonate resin (A) may have a weight average molecular weight (Mw) of about 10,000 to 200,000 g/mol.

The inorganic filler may be at least one selected from the group consisting of a glass fiber, a carbon fiber, a ceramic fiber, calcium carbonate, silica, alumina, aluminum hydroxide, talc, clay, mica, barium sulfate, whiskers, and mixtures thereof.

The Tg regulator including phosphorus (C) may be a compound having a structure of the following Chemical Formula 1:

[Chemical Formula 1]

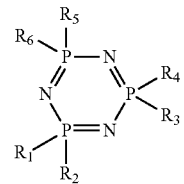

wherein in Chemical Formula 1, $R_1$ to $R_6$ are the same or different and are each independently hydrogen, halogen, C1-C20 alkyl, C2-C7 alkenyl, C3-C20 cycloalkyl, C2-C20 heterocycloalkyl, C1-C20 alkoxy, C6-C20 aryl, C5-C20 heteroaryl, C1-C10 alkoxycarbonyl C1-C10 alkyl, carbonyl C1-C10 alkyl, amino or hydroxy, wherein the alkyl, alkenyl, cycloalkyl, heterocycloalkyl, alkoxycarbonylalkyl, and carbonylalkyl may be further substituted with at least one of C1-C10 alkyl, halogen, nitro, cyano, hydroxy, amino, C6-C10 aryl, C3-C10 cycloalkyl, C3-C10 heterocycloalkyl, and/or C4-C10 heteroaryl.

The Tg regulator including phosphorus (C) may be a compound having a structure of the following Chemical Formula 2, a compound having a structure of the following Chemical Formula 3, and/or a compound having a structure of the following Chemical Formula 4:

[Chemical Formula 2]

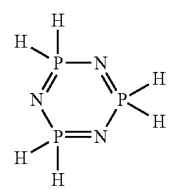

-continued

[Chemical Formula 3]

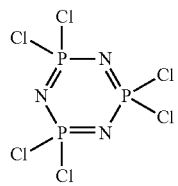

[Chemical Formula 4]

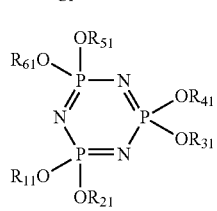

wherein in Chemical Formula 4, $R_{11}$ to $R_{61}$ are the same or different and are each independently hydrogen, methyl, ethyl, propyl, isopropyl, butyl, pentyl, hexyl or benzyl.

The polycarbonate resin composition having improved appearance and flowability may further include one or more additives selected from the group consisting of antibacterial agents, heat stabilizers, antioxidants, release agents, light stabilizers, surfactants, coupling agents, plasticizers, compatibilizers, lubricants, antistatic agents, coloring agents, such as pigments and/or dyes, flame retardants, flame retardant aids, anti-dripping agents, weather resistant agents, ultraviolet radiation absorbers, ultraviolet radiation blockers, and mixtures thereof.

In other exemplary embodiments, the present invention provides a molded article manufactured by the polycarbonate resin composition as described above.

The molded article may satisfy the following Equations 1 to 3:

$$50 \leq Gloss \leq 90 \quad \text{[Equation 1]}$$

$$80 \leq Yp \leq 100 \quad \text{[Equation 2]}$$

$$150 \leq Spiral\ length \leq 200 \quad \text{[Equation 3]}$$

wherein in Equation 1, Gloss is a 60-degree average value of a rectangular-shaped molded sample having a size of 9 cm×5 cm measured at 60 degrees by a Glossmeter;

in Equation 2, Yp is a coating yield (%) obtained by coating 100 molded samples each having a size of 10 cm×10 cm×1 cm, determining a article having a concave-convex portion formed therein inspected by the naked eye as a defective article, and measuring the number of non-defective articles except for the defective article; and in Equation 3, Spiral length is a flow length (mm) measured by injection-molding the polycarbonate resin composition of the invention using a spiral-shaped mold having a thickness of 1 mm and a width of 1 cm at 310.

The molded article may be an exterior material of a cellular phone.

DETAILED DESCRIPTION

Figure 1A:
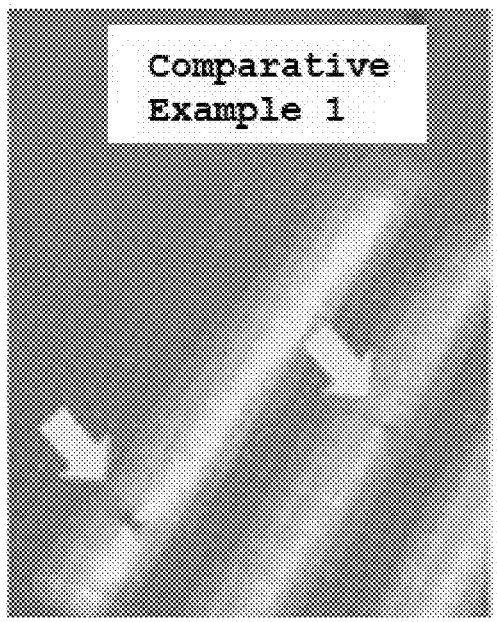
FIG. 1(a) is a microscope photograph showing whether or not a concave-convex portion is formed on a coated surface of a molded article manufactured using a polycarbonate resin composition according to a comparative example.

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

Unless technical and scientific terms used herein are defined otherwise, they have meanings understood by those skilled in the art to which the present invention pertains. Known functions and components which obscure the description and the accompanying drawings of the present invention with unnecessary detail will be omitted.

The present inventors made an effort to develop a polycarbonate resin composition having excellent workability to provide improved molding processability and appearance properties without reducing mechanical properties such as impact resistance, and the like, and as a result, surprisingly found that a polycarbonate resin composition including a polycarbonate resin, an inorganic filler, and a Tg regulator including phosphorus may have remarkably improved flowability with minimal or no reduction of mechanical properties such as impact resistance, flexural modulus, and the like, to remarkably improve an appearance property and a coating yield, thereby completing the present invention.

Hereinafter, each component is described in more detail.

The polycarbonate resin composition of the present invention includes (A) a polycarbonate resin, (B) an inorganic filler, and (C) a Tg regulator including phosphorus.

Hereinafter, each component is described in more detail.

(A) Polycarbonate Resin

A polycarbonate resin according to an exemplary embodiment of the present invention may have mechanical properties such as rigidity, impact strength, and the like, an appearance property, and excellent molding processability. The polycarbonate resin is not limited as long as it is a polycarbonate resin prepared by generally known methods. Examples of the polycarbonate resin may include without limitation aliphatic polycarbonate resins, aromatic polycarbonate resins, copolycarbonate resins thereof, copolyester carbonate resins thereof, polycarbonate-polysiloxane copolymer resins, and the like, and mixtures thereof. In exemplary embodiments, an aromatic polycarbonate resin may be used.

In addition, as the polycarbonate resin, a linear polycarbonate resin, a branched polycarbonate resin, or mixtures of the linear and branched polycarbonate resins, in view of a structure, may be used, but the present invention is not limited thereto.

The polycarbonate resin according to an exemplary embodiment of the present invention may be prepared by reacting an aromatic dihydroxy compound (A1) with a carbonate precursor (A2).

(A1) Aromatic Dihydroxy Compound

The aromatic dihydroxy compound (A1) may be a compound represented by the following Chemical Formula 5 or mixtures thereof:

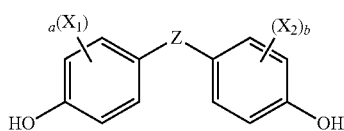

[Chemical Formula 5]

wherein, in Chemical Formula 5, $X_1$ and $X_2$ are the same or different and are each independently hydrogen, halogen, or $C_1$-$C_8$ alkyl; a and b are the same or different and are each independently an integer of 0 to 4; and Z is a single bond, $C_1$-$C_8$ alkylene, $C_2$-$C_8$ alkylidene, $C_5$-$C_{15}$ cycloalkylene, $C_5$-$C_{15}$ cycloalkylidene, —S—, —SO—, $SO_2$—, —O—, or —CO—.

Examples of the aromatic dihydroxy compound (A1) represented by Chemical Formula 5 include without limitation bis(hydroxy aryl)alkanes, bis(hydroxy aryl)cycloalkanes, bis(hydroxy aryl)ethers, bis(hydroxy aryl)sulfides, bis(hydroxy aryl)sulfoxides, biphenyl compounds, and the like, wherein these compounds may be used alone or as a mixture including two or more thereof.

Examples of bis(hydroxy aryl)alkanes include without limitation bis(4-hydroxy phenyl)methane, bis(3-methyl-4-hydroxy phenyl)methane, bis(3-chloro-4-hydroxy phenyl)methane, bis(3,5-dibromo-4-hydroxy phenyl)methane, 1,1-bis(4-hydroxy phenyl)ethane, 1,1-bis(2-tertiary-butyl-4-hydroxy-3-methyl phenyl)ethane, 2,2-bis(4-hydroxy phenyl)propane(bisphenol A), 2,2-bis(3-methyl-4-hydroxy phenyl) propane, 2,2-bis(2-methyl-4-hydroxy phenyl)propane, 2,2-bis(3,5-dimethyl-4-hydroxy phenyl)propane, 1,1-bis(2-tertiary-butyl-4-hydroxy-5-methyl phenyl)propane, 2,2-bis(3-chloro-4-hydroxy phenyl)propane, 2,2-bis(3-fluoro-4-hydroxy phenyl)propane, 2,2-bis(3-bromo-4-hydroxy phenyl)propane, 2,2-bis(3,5-difluoro-4-hydroxy phenyl)propane, 2,2-bis(3,5-dichloro-4-hydroxy phenyl)propane, 2,2-bis(3,5-dibromo-4-hydroxy phenyl)propane, 2,2-bis(4-hydroxy phenyl)butane, 2,2-bis(4-hydroxy phenyl)octane, 2,2-bis(4-hydroxy phenyl)phenyl methane, 2,2-bis(4-hydroxy-1-methyl phenyl)propane, 1,1-bis(4-hydroxy-tertiary-butyl phenyl)propane, 2,2-bis(4-hydroxy-3-bromo phenyl)propane, 2,2-bis(4-hydroxy-3,5-dimethylphenyl)propane, 2,2-bis(4-hydroxy-3,5-dimethyl phenyl)propane, 2,2-bis(4-hydroxy-3-chloro phenyl)propane, 2,2-bis(4-hydroxy-3,5-dichloro phenyl)propane, 2,2-bis(4-hydroxy-3,5-dibromo phenyl)propane, 2,2-bis(4-hydroxy-3,5-dibromo phenyl) propane, 2,2-bis(3-bromo-4-hydroxy-5-chloro phenyl)propane, 2,2-bis(3-phenyl-4-hydroxy phenyl)propane, 2,2-bis (4-hydroxy phenyl)butane, 2,2-bis(3-methyl-4-hydroxy phenyl)butane, 1,1-bis(2-butyl-4-hydroxy-5-methyl phenyl) butane, 1,1-bis(2-tertiary-butyl-4-hydroxy-5-methyl phenyl) butane, 1,1-bis(2-tertiary-butyl-4-hydroxy-5-methyl phenyl) isobutane, 1,1-bis(2-tertiary-amyl-4-hydroxy-5-methyl phenyl)butane, 2,2-bis(3,5-dichloro-4-hydroxy phenyl)butane, 2,2-bis(3,5-dibromo-4-hydro phenyl)butane, 4,4-bis(4-hydroxy phenyl)heptane, 1,1-bis(2-tertiary-butyl-4-hydroxy-5-methyl phenyl)heptane, 2,2-bis(4-hydroxy phenyl) octane, 1,1-(4-hydroxy phenyl)ethane, and the like, and mixtures thereof.

Examples of bis(hydroxy aryl)cycloalkanes include without limitation 1,1-bis(4-hydroxy phenyl)cyclopentane, 1,1-bis(4-hydroxy phenyl)cyclohexane, 1,1-bis(3-methyl-4-hydroxy phenyl)cyclohexane, 1,1-bis(3-cyclohexyl-4-hydroxy phenyl)cyclohexane, 1,1-bis(3-phenyl-4-hydroxy phenyl)cyclohexane, 1,1-bis(4-hydroxy phenyl)-3,5,5-trimethylcyclohexane, and the like, and mixtures thereof.

Examples of bis(hydroxy aryl)ethers include without limitation bis(4-hydroxy phenyl)ether, bis(4-hydroxy-3-methyl phenyl)ether, and the like, and mixtures thereof.

Examples of bis(hydroxy aryl)sulfides include without limitation bis(4-hydroxy phenyl)sulfide, bis(3-methyl-4-hydroxy phenyl)sulfide, and the like, and mixtures thereof.

Examples of bis(hydroxy aryl)sulfoxides include without limitation bis(hydroxy phenyl)sulfoxide, bis(3-methyl-4-hydroxy phenyl)sulfoxide, bis(3-phenyl-4-hydroxy phenyl)sulfoxide, and the like, and mixtures thereof.

Examples of biphenyl compounds include without limitation bis(hydroxy aryl)sulfones such as bis(4-hydroxy phenyl) sulfone, bis(3-methyl-4-hydroxy phenyl)sulfone, and bis(3-phenyl-4-hydroxy phenyl)sulfone, 4,4'-dihydroxy biphenyl, 4,4'-dihydroxy-2,2'-dimethylbiphenyl, 4,4'-dihydroxy-3,3'-dimethylbiphenyl, 4,4'-dihydroxy-3,3'-dicyclo biphenyl, 3,3-difluoro-4,4'-dihydroxy biphenyl, and the like, and mixtures thereof.

Examples of the aromatic dihydroxy compound (A1) used in the present invention other than the compound represented by Chemical Formula 5 above include without limitation dihydroxy benzene, halogen and/or C1-C10 alkyl-substituted dihydroxy benzene, and the like, and mixtures thereof.

In exemplary embodiments, resorcinol, 3-methylresorcinol, 3-ethylresorcinol, 3-propylresorcinol, 3-butylresorcinol, 3-tertiary-butylresorcinol, 3-phenylresorcinol, 2,3,4,6-tetrafluororesorcinol, 2,3,4,6-tetrabromoresorcinol, catechol, hydroquinone, 3-methylhydroquinone, 3-ethylhydroquinone, 3-propylhydroquinone, 3-butylhydroquinone, 3-tertiary-butylhydroquinone, 3-phenylhydroquinone, 3-cumyl hydroquinone, 2,5-dichlorohydroquinone, 2,3,5,6-tetramethylhydroquinone, 2,3,5,6-tetra-tertiary-butylhydroquinone, 2,3,5,6-tetrafluorohydroquinone, and/or 2,3,5,6-tetrabromo hydroquinone, may be used, but the present invention is not limited thereto.

In exemplary embodiments, as the aromatic dihydroxy compound (A1), 2,2-bis(4-hydroxy phenyl)propane(bisphenol A) may be used.

(A2) Carbonate Precursor

Examples of the carbonate precursor include without limitation dimethyl carbonate, diethyl carbonate, dibutyl carbonate, dicyclohexyl carbonate, diphenyl carbonate, ditolyl carbonate, bis(chlorophenyl)carbonate, m-cresyl carbonate, dinaphthyl carbonate, bis(diphenyl)carbonate, carbonyl chloride (phosgene), triphosgene, diphosgene, carbonyl bromide, bishaloformate, and the like. These compounds may be used alone or as a mixture including two or more thereof.

The carbonate precursor A2 may be used in a molar ratio of about 0.9 to about 1.5 based on about 1 mol of the aromatic dihydroxy compound (A1).

The polycarbonate resin according to an exemplary embodiment of the present invention may have a weight average molecular weight (Mw) of about 10,000 to about 200,000 g/mol, for example, about 15,000 to about 80,000 g/mol. In this case, processability may be improved.

The polycarbonate resin composition may include the polycarbonate resin (A) according to an exemplary embodiment of the present invention in an amount about 50 to about 85 wt %, for example about 60 to about 75 wt %, based on the total weight (100 wt %) of the polycarbonate resin composition. In some embodiments, the polycarbonate resin composition may include the polycarbonate resin (A) in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, or 85 wt %. Further, according to some embodiments of the present invention, the amount of the polycarbonate resin (A) can be in a range from about any of the foregoing amounts to about any other of the foregoing amounts.

When the amount of the polycarbonate resin is within the above range, impact resistance, thermal resistance, and/or molding processability may be further improved.

(B) Inorganic Filler

The inorganic filler according to an exemplary embodiment of the present invention may be added to the polycarbonate resin to improve strength of a resin. Various forms and kinds of the inorganic filler known in the art may be used without limitation.

Examples of the inorganic filler may include without limitation fibrous inorganic fillers, such as glass fiber, carbon fiber, ceramic fiber, metal fiber, and the like, calcium carbonate, silica, alumina, aluminum hydroxide, talc, clay, mica, barium sulfate, whiskers, and the like, and mixtures thereof.

The inorganic filler may have a cross section having various shapes such as circle, oval, rectangle, and the like.

In exemplary embodiments, the inorganic filler of the present invention is a glass fiber, and all kinds and all forms of glass fibers may be used.

The glass fiber according to an exemplary embodiment of the present invention may be a glass fiber having a cylindrical cross section and/or a plate shaped glass fiber. The glass fiber having a cylindrical cross section may have a cross-sectional diameter of about 5 to about 20 um, and have a length of about 2 to about 5 mm before processing. The plate-shaped glass fiber may have a cross-sectional aspect ratio of about 1.5 to about 10, and have a length of about 2 to about 5 mm before processing. In this case, processability may be improved, mechanical properties such as tensile strength, impact resistance, flexural modulus, and the like, of a molded article, and an appearance property of an injected article may also be improved.

In order to increase a binding force with the polycarbonate resin, a surface of the inorganic filler may be coated with a surface treating agent. Examples of the surface treating agent include without limitation silane-based compounds, urethane-based compounds, epoxy-based compounds, and the like, and mixtures thereof.

The polycarbonate resin composition may include the inorganic filler (B) according to an exemplary embodiment of the present invention in an amount of about 10 to about 40 wt %, for example about 20 to about 35 wt %, based of the total weight (100 wt %) of the polycarbonate resin composition. In some embodiments, the polycarbonate resin composition may include the inorganic filler (B) in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt %. Further, according to some embodiments of the present invention, the amount of the inorganic filler (B) can be in a range from about any of the foregoing amounts to about any other of the foregoing amounts.

When the amount of the inorganic filler is less than about 10 wt %, impact resistance and thermal resistance may be decreased. When the amount of the inorganic filler is more than about 40 wt %, flowability may be deteriorated to decrease molding processability, and at the time of injection-molding the composition as a molded article, since the inorganic filler may protrude, appearance thereof may be deteriorated.

(C) Tg Regulator Including Phosphorus

The Tg regulator including phosphorus according to an exemplary embodiment of the present invention may reduce a glass transition temperature (Tg) of the polycarbonate resin to improve flowability.

Examples of the Tg regulator including phosphorus may include without limitation phosphates, phosphonates, phosphinates, phosphine oxides, phosphazenes, and the like, and mixtures thereof.

In exemplary embodiments, linear phosphazene and/or cyclic phosphazene may be used.

The Tg regulator including phosphorus (C) according to an exemplary embodiment of the present invention may be a compound having a structure of the following Chemical Formula 1, or a mixture thereof:

[Chemical Formula 1]

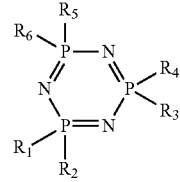

wherein in Chemical Formula 1, $R_1$ to $R_6$ are the same or different and are each independently hydrogen, halogen, C1-C20 alkyl, C2-C8 alkenyl, C3-C20 cycloalkyl, C2-C20 heterocycloalkyl, C1-C20 alkoxy, C6-C20 aryl, C5-C20 heteroaryl, C1-C10 alkoxycarbonyl C1-C10 alkyl, carbonyl C1-C10 alkyl, amino or hydroxy, wherein the alkyl, alkenyl, cycloalkyl, heterocycloalkyl, alkoxycarbonylalkyl, carbonylalkyl may be further substituted with one or more C1-C10 alkyl, halogen, nitro, cyano, hydroxy, amino, C6-C10 aryl, C3-C10 cycloalkyl, C3-C10 heterocycloalkyl, and/or C4-C10 heteroaryl.

As used herein, the terms "alkyl", "alkoxy", and other substituents including "alkyl" include linear and/or branched alkyl, alkoxy, etc., and the term "alkenyl" includes C2 to C8 linear and/or branched alkenyl and at least one double bond.

As used herein, the term "cycloalkyl" includes C3 to C20 saturated monocyclic and/or saturated bicyclic ring structures.

As used herein, the term "aryl" includes organic radicals derived from aromatic hydrocarbon due to removal of one hydrogen, and includes single ring systems and/or fused ring systems including 4 to 7 ring atoms, for example, 5 or 6 ring atoms in each ring. Examples of aryl include without limitation phenyl, naphthyl, biphenyl, tolyl, and the like, and mixtures thereof.

As used herein, the term "heterocycloalkyl" means a cycloalkyl group including 1 to 3 heteroatoms such as N, O, and/or S as a saturated cyclic hydrocarbon framework atom(s) and carbon as the remaining saturated monocyclic and/or bicyclic ring framework atoms. Examples of the heterocycloalkyl include without limitation pyrrolidinyl, azetidinyl, pyrazolidinyl, oxazolidinyl, piperidinyl, piperazinyl, morpholinyl, thiomorpholinyl, thiazolidinyl, hydantoinyl, valerolactamyl, oxiranyl, oxetanyl, dioxolanyl, dioxanyl, oxathiolanyl, oxathianyl, dithianyl, dihydrofuranyl, tetrahydrofuranyl, dihydropyranyl, tetrahydropyranyl, tetrahydropyridinyl, tetrahydropyrimidinyl, tetrahydrothiophenyl, tetrahydrothiopyranyl, diazepanyl, azepanyl, and the like, and mixtures thereof.

As used herein, the term "heteroaryl" means an aryl group including 1 to 3 heteroatoms such as N, O, and/or S as an aromatic ring framework atom(s) and carbon as the remaining aromatic ring framework atoms. The heteroaryl group can include a bivalent aryl group forming N-oxide and/or a quaternary salt by an oxidized or quaternized heteroatom in a ring. Examples of heteroaryl include without limitation furyl, thiophenyl, pyrrolyl, pyranyl, imidazolyl, pyrazolyl, thiazolyl, thiadiazolyl, isothiazolyl, isoxazolyl, oxazolyl, oxadiazolyl, triazinyl, tetrazinyl, triazolyl, tetrazolyl, furazanyl, pyridyl, pyrazinyl, pyrimidinyl, pyridazinyl, and the like, and mixtures thereof.

In exemplary embodiments, the Tg regulator including phosphorus (C) of the present invention may include a compound having a structure of the following Chemical Formula 2, a compound having a structure of the following Chemical Formula 3, and/or a compound having a structure of the following Chemical Formula 4:

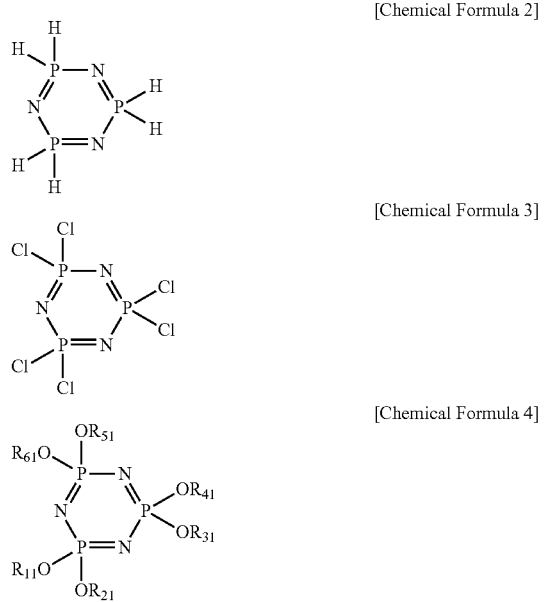

[Chemical Formula 2]

[Chemical Formula 3]

[Chemical Formula 4]

wherein in Chemical Formula 4, $R_{11}$ to $R_{61}$ are the same or different and are each independently hydrogen, methyl, ethyl, propyl, isopropyl, butyl, pentyl, hexyl or benzyl.

At the time of using the Tg regulator including phosphorus selected from the compounds of Chemical Formulas 2 to 4, the Tg of the polycarbonate resin may be reduced to improve flowability and maintain excellent mechanical properties.

The polycarbonate resin composition may include the Tg regulator including phosphorus (C) according to an exemplary embodiment of the present invention in an amount of about 1 to about 10 wt %, for example about 1 to about 5 wt %, based on the total weight (100 wt %) of the polycarbonate resin composition. In some embodiments, the polycarbonate resin composition may include the Tg regulator including phosphorus (C) in an amount of about 1, 2, 3, 4, 5, 6, 7, 8, 9, or 10 wt %. Further, according to some embodiments of the present invention, the amount of the Tg regulator including phosphorus (C) can be in a range from about any of the foregoing amounts to about any other of the foregoing amounts.

When the amount of the Tg regulator is less than about 1 wt %, an effect in which the Tg of the polycarbonate resin is reduced may not be sufficient, such that improvement in flowability may not be affected. In addition, when the amount of the Tg regulator is more than about 10 wt %, Tg can be excessively reduced, such that mechanical properties such as impact resistance, and the like, may be remarkably reduced, and a problem that the inorganic filler protrudes to deteriorate the appearance at the time of injection-molding, may be intensified.

The polycarbonate resin composition of the present invention may further contain various additives depending on a usage thereof so long as the additives do not significantly negatively impact the properties of the compositions of the present invention.

Examples of the additive may include without limitation antibacterial agents, heat stabilizers, antioxidants, release agents, light stabilizers, surfactants, coupling agents, plasticizers, compatibilizers, lubricants, antistatic agents, coloring agents, such as pigments and/or dyes, flame retardants, flame retardant aids, anti-dripping agents, weather resistant agents, ultraviolet radiation absorbers, ultraviolet radiation blockers, and the like, and mixtures thereof. The amount of the additive may be easily determined by a person skilled in the art.

The polycarbonate resin composition of the present invention may be prepared by methods known in the art. For example, each component and optional additive(s) can be mixed by a Henschel mixer, a V blender, a tumbler blender, a ribbon blender, and the like, followed by melt-extrusion by a single screw extruder or a twin-screw extruder at a temperature of about 150 to about 300, thereby preparing a pellet form. Here, the components except for the inorganic filler may be put into a main feeder, and the inorganic filler may be put into a side feeder. For example, the pellet form may be prepared by extrusion under conditions including a temperature of about 250 to about 280, a screw rotation rate of about 300 to about 600 rpm, and a self-supply rate of 60 to 600K/hr, using a twin-screw extruder of L/D=29 and (=45 mm. The prepared pellet may be dried at 100 for 3 hours or more and may be injection-molded as a sample.

According to another exemplary embodiment of the present invention, there is provided a molded article that can have improved appearance and/or flowability, manufactured by molding the above-described polycarbonate resin composition. The molded articles may be manufactured by various processes such as an injection-molding, a double injection-molding, a blow molding, an extrusion molding, a heat molding, and the like, by using the polycarbonate resin composition.

In addition, the molded article can satisfy the following Equations 1 to 3:

$$50 \leq Gloss \leq 90 \quad \text{[Equation 1]}$$

$$80 \leq Yp \leq 100 \quad \text{[Equation 2]}$$

$$150 \leq Spiral\ length \leq 200 \quad \text{[Equation 3]}$$

in Equation 1, Gloss is a 60-degree average value of a rectangular-shaped molded sample having a size of 9 cm×5 cm measured at 60 degrees measured by a Glossmeter;

in Equation 2, Yp is a coating yield (%) obtained by coating 100 molded samples each having a size of 10 cm×10 cm×1 cm, determining a article having a concave-convex portion formed therein inspected by the naked eye as a defective article, and measuring the number of non-defective articles except for the defective article; and in Equation 3, Spiral length is a flow length (mm) measured by injection-molding the polycarbonate resin composition of the invention using a spiral-shaped mold having a thickness of 1 mm and a width of 1 cm at 310.

It may be appreciated that the molded article manufactured by the polycarbonate resin composition of the present invention includes a polycarbonate resin, an inorganic filler, and a Tg regulator including phosphorus, such that excellent mechanical properties and molding processability may be maintained, flowability and an appearance property after injection-molding may be improved, and a coating yield may be remarkably improved.

Figure 1B:
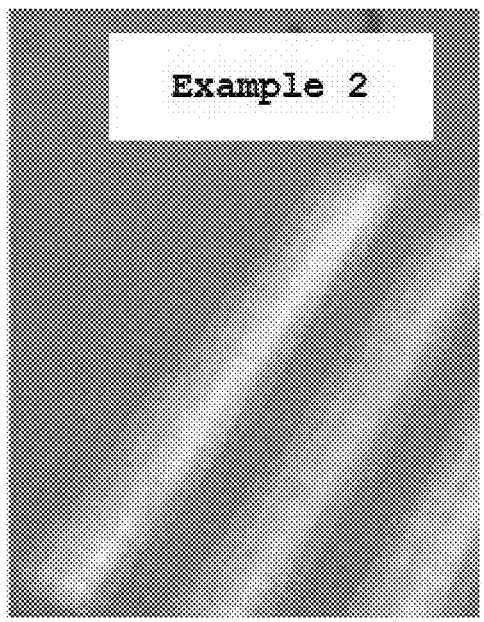
FIG. 1(b) is a microscope photograph showing whether or not a concave-convex portion is formed on a coated surface of a molded article manufactured using a polycarbonate resin composition according an exemplary embodiment of the present invention.

FIGS. 1(a) and (b) are microscope photographs showing an appearance property of a molded article manufactured using a polycarbonate resin composition according to a comparative example and a polycarbonate resin composition according to an exemplary embodiment of the present invention, respectively. Referring to FIG. 1(b), it may be appreciated that when the composition includes the Tg regulator including phosphorus, protrusion of the inorganic filler, which affects the appearance of the molded article, is remarkably decreased, such that the appearance property thereof may be improved.

Therefore, the polycarbonate resin composition may be effectively used as exterior materials of electronic devices such as cellular phones and the like, requiring the above-described properties.

Hereinafter, the following Examples will be provided in order to describe the present invention in more detail. However, the present invention is not limited to these Examples.

Specifications of each component used in the following Examples and Comparative Examples are as follows.

(A1) Polycarbonate Resin

INFINO (melt Index (300, 1.2 kg)=20 g/10 min, weight average molecular weight: 24,000 g/mol) which is a polycarbonate resin obtained from Cheil Industries Inc., is used.

(A2) Polycarbonate Resin

INFINO (melt Index (300, 1.2 kg)=65 g/10 min, weight average molecular weight: 18,000 g/mol) which is a polycarbonate resin obtained from Cheil Industries Inc., is used.

(B) Inorganic Filler

A glass fiber (Owens Corning 183F) having an average length of about 3 mm is used.

(C1) Tg Regulator Including Phosphorus

Cyclophosphazene (Rabitle FP-110, Fushimi Pharmaceutical Co., Ltd.) is used.

(C2) Tg Regulator Including Phosphorus

Hexachlorocyclophosphazene (Samreal 87, Ningbo Samreal Chemical CO., LTD.) is used.

(D) Lubricant

HDPE wax typed lubricant (HI-WAX 400P, Mitsui Petrochemical Industries, Ltd.) is was used.

(E) Antioxidant

As an antioxidant, bis(2,4-dicumylphenyl)pentaerythritol diphosphite Doverphos S-9228 PC (Dover Chemical Corporation) is used.

Physical Properties Evaluation Method (1) Appearance (Gloss) Measurement

A rectangular-shaped glossy sample having a size of 9*5 cm is measured at 60 degrees using a VG7000 gloss meter manufactured by Nippon Denshoku Industries Co., Ltd.

(2) Coating Yield Measurement

A coating yield (%) is measured by performing a coating process including three stages of a lower stage, a middle stage, and an upper stage on 100 samples injection-molded with each having a size of 10 cm×10 cm×1 cm, determining an article inspected by the naked eye, wherein an article without a concave-convex portion is determined as a non-defective article and an article having even one concave-convex portion formed therein is determined as a defective article, and measuring the number of non-defective articles (excluding the defective articles).

(3) Impact Resistance Measurement (DuPont Drop Test)

Impact resistance is measured by injection-molding a flat typed sample having a size of 1 mm×5 cm×5 cm (thickness× width×length), performing an aging process for 6 hours or more at room temperature, applying an impact to 20 or more samples by a falling weight evaluating apparatus (DuPont drop test, a weight of 500 g), and measuring an average height that 50% of the sample is destroyed as a numerical value in a unit of cm.

(4) Flexural Modulus

Flexural modulus is measured under ASTM D790 standard at a rate of 2.8 mm/min.

(5) Flowability (Spiral Length)

Flowability is measured by injection-molding the polycarbonate resin composition using a spiral-shaped mold having a thickness of 1 mm and a width of 1 cm at 310° C. while maintaining a constant pressure, rate, and a cushion amount, and measuring a length in which the resin flows in a unit of mm.

Examples 1 and 2

The polycarbonate resin (A1), the Tg regulator including phosphorus (C), the lubricant (D), and the antioxidant (E) each in an amount shown in the following Table 1 are mixed, followed by dry blending, to prepare each polycarbonate resin composition of Examples 1 and 2, and each polycarbonate resin composition is processed at a nozzle temperature of 250 to 280 using a twin-screw extruder satisfying (=45 mm to be prepared as a pellet. Here, the inorganic filler (B) is put into a side feeder. Each prepared pellet is dried for 3 hours at 100 and injection-molded as a sample. Physical properties of the injection-molded sample are measured and shown in the following Table 2.

Example 3

As shown in the following Table 1, a polycarbonate resin of Example 3 is prepared by the same method as Example 1 except for using a mixture of the Tg regulator (C1) and the Tg regulator (C2) and injection-molded as a sample. Physical properties of the injection-molded sample are measured and shown in the following Table 2.

Comparative Example 1

As shown in the following Table 1, a polycarbonate resin of Comparative Example 1 is prepared by the same method as Example 1 except for not using the Tg regulator including phosphorus (C) and injection-molded as a sample. Physical properties of the injection-molded sample are measured and shown in the following Table 2.

Comparative Example 2

As shown in the following Table 1, a polycarbonate resin of Comparative Example 2 is prepared by the same method as Example 1 except for using an excessive amount of the lubricant (D) and injection-molded as a sample. Physical properties of the injection-molded sample are measured and shown in the following Table 2.

Comparative Example 3

As shown in the following Table 1, a polycarbonate resin of Comparative Example 3 is prepared by the same method as Example 1 except for using the polycarbonate resin (A2) having a different molecular weight from that of the polycarbonate resin (A1) and injection-molded as a sample. Physical properties of the injection-molded sample are measured and shown in the following Table 2.

Comparative Examples 4 and 5

As shown in the following Table 1, each polycarbonate resin of Comparative Examples 4 and 5 is prepared by the same method as Example 1 except for using the Tg regulator including phosphorus (C) in an amount outside of the range of the present invention and injection-molded as a sample. Physical properties of the injection-molded sample are measured and shown in the following Table 2.

TABLE 1

|  | Example 1 | Example 2 | Example 3 | Comparative Example 1 | Comparative Example 2 | Comparative Example 3 | Comparative Example 4 | Comparative Example 5 |
|---|---|---|---|---|---|---|---|---|
| (A1) Polycarbonate | 67 | 65 | 67 | 70 | 67 | — | 67 | 50 |
| (A2) Polycarbonate |  |  |  |  |  | 70 |  | — |
| (B) Inorganic Filler | 30 | 30 | 30 | 30 | 30 | 30 | 32.5 | 30 |
| (C1) Tg Regulator | 3 | 5 | 1.5 | — | — | — | 0.5 | 20 |
| (C2) Tg Regulator |  |  | 1.5 |  |  |  |  |  |
| (D) Lubricant | 0.3 | 0.3 | 0.3 | 0.3 | 3.0 | 0.3 | 0.3 | 0.3 |
| (E) Antioxidant | 0.3 | 0.3 | 0.3 | 0.3 | 0.3 | 0.3 | 0.3 | 0.3 |

TABLE 2

|  | Example 1 | Example 2 | Example 3 | Comparative Example 1 | Comparative Example 2 | Comparative Example 3 | Comparative Example 4 | Comparative Example 5 |
|---|---|---|---|---|---|---|---|---|
| Appearance (Gloss) | 65 | 67 | 70 | 35 | 50 | 60 | 48 | 45 |
| Coating Yield (%) | 95 | 98 | 98 | 5 | 20 | 70 | 10 | 0 |
| Impact Resistance (cm) | 65 | 63 | 68 | 69 | 55 | 25 | 70 | 42 |
| Flexural Modulus (kgf/cm$^2$) | 67,000 | 67,000 | 67,000 | 68,000 | 65,000 | 67,000 | 67,000 | 65,000 |
| Flowability (mm) | 170 | 175 | 170 | 125 | 210 | 215 | 165 | 222 |

As demonstrated in Table 2 above, Examples 1 to 3 of the present invention, which include the Tg regulator including phosphorus, exhibit excellent appearance (gloss) as compared to Comparative Examples 1 to 3, which do not include the Tg regulator including phosphorus. In addition, Examples 1 to 3 have excellent impact resistance to provide mechanical properties required for exterior materials of portable electronic devices.

Comparative Example 2 including the lubricant rather than the Tg regulator of the present invention has excellent flowability but significantly decreased coating yield, and Comparative Example 3, which includes the low molecular weight polycarbonate resin, exhibits significantly decreased impact resistance.

In addition, in Comparative Example 4 which includes the Tg regulator in an amount less than the amount used in accordance with the present invention, improvement in flowability is rarely affected but appearance property and coating yield are decreased. In Comparative Example 5 which includes the Tg regulator in an amount greater than the amount used in accordance with the present invention, flowability is excellent, but impact resistance is decreased, and at the time of injection-molding, a coating yield is significantly decreased due to the protrusion of the glass fiber.

Therefore, when the Tg regulator including phosphorus is included within the range of amounts described herein, flowability is improved, such that the protrusion of the inorganic filler occurring at the time of injection-molding may be prevented beforehand, thereby providing an aesthetic appearance, and therefore, a coating yield may be remarkably improved to largely increase productivity.

The polycarbonate resin composition according to the present invention may have remarkably improved appearance and flowability without reducing mechanical properties such as impact resistance and flexural modulus, thereby solving a problem that the inorganic filler protrudes to deteriorate an appearance of a molded article manufactured by the polycarbonate resin composition, and remarkably improving a coating yield.

Therefore, at the time of manufacturing the molded article, an appearance itself may be excellent, such that excellent surface and physical properties as exterior materials of electronic devices such as a cellular phone, and the like, may be provided without additional machining processes.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

What is claimed is:

1. A polycarbonate resin composition having improved appearance and flowability comprising:
   (A) about 50 to about 85 wt % of a polycarbonate resin,
   (B) about 10 to about 40 wt % of an inorganic filler, and
   (C) about 1 to about 10 wt % of a Tg regulator including phosphorus,
   wherein a molded article manufactured using the polycarbonate resin composition satisfies the following Equations 1 to 3:

$$50 \leq Gloss \leq 90 \quad \text{[Equation 1]}$$

$$80 \leq Yp \leq 100 \quad \text{[Equation 2]}$$

$$150 \leq Spiral\ length \leq 200 \quad \text{[Equation 3]}$$

wherein:
   in Equation 1, Gloss is a 60-degree average value of a rectangular-shaped molded sample having a size of 9 cm×5 cm measured at 60 degrees by a Glossmeter;
   in Equation 2, Yp is a coating yield (%) obtained by coating 100 molded samples each having a size of 10 cm×10 cm×1 cm, determining an article having a concave-convex portion formed therein inspected by the naked eye as a defective article, and measuring the number of non-defective articles except for the defective article; and
   in Equation 3, Spiral length is a flow length (mm) measured by injection-molding the polycarbonate resin composition using a spiral-shaped mold having a thickness of 1 mm and a width of 1 cm at 310° C.

2. The polycarbonate resin composition of claim 1, wherein the polycarbonate resin (A) has a weight average molecular weight (Mw) of about 10,000 to about 200,000 g/mol.

3. The polycarbonate resin composition of claim 1, wherein the inorganic filler comprises a glass fiber, a carbon fiber, a ceramic fiber, calcium carbonate, silica, alumina, aluminum hydroxide, talc, clay, mica, barium sulfate, whisker or a mixture thereof.

4. The polycarbonate resin composition of claim 1, further comprising an additive selected from the group consisting of antibacterial agents, heat stabilizers, antioxidants, release agents, light stabilizers, surfactants, coupling agents, plasticizers, compatibilizers, lubricants, antistatic agents, pigments, dyes, flame retardants, flame retardant aids, anti-dripping agents, weather resistant agents, ultraviolet radiation absorbers, ultraviolet radiation blockers, and mixtures thereof.

5. The polycarbonate resin composition of claim 1, wherein the Tg regulator including phosphorus (C) is a compound having a structure of the following Chemical Formula 1, or a mixture thereof:

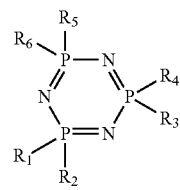

[Chemical Formula 1]

wherein in Chemical Formula 1, $R_1$ to $R_6$ are the same or different and are each independently hydrogen, halogen, C1-C20 alkyl, C2-C8 alkenyl, C3-C20 cycloalkyl, C2-C20 heterocycloalkyl, C1-C20 alkoxy, C6-C20 aryl, C5-C20 heteroaryl, C1-C10 alkoxycarbonyl C1-C10 alkyl, carbonyl C1-C10 alkyl, amino, hydroxy, or phenoxy, wherein the alkyl, alkenyl, cycloalkyl, heterocycloalkyl, alkoxycarbonylalkyl, and carbonylalkyl may be substituted with C1-C10 alkyl, halogen, nitro, cyano, hydroxy, amino, C6-C10 aryl, C3-C10 cycloalkyl, C3-C10 heterocycloalkyl, C4-C10 heteroaryl, or a mixture thereof.

6. The polycarbonate resin composition of claim 5, wherein the Tg regulator including phosphorus (C) comprises a compound selected from the group consisting of a compound having a structure of the following Chemical Formula 2, a compound having a structure of the following Chemical Formula 3, a compound having a structure of the following Chemical Formula 4, and mixtures thereof:

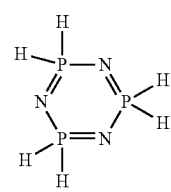

[Chemical Formula 2]

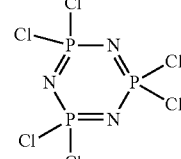

[Chemical Formula 3]

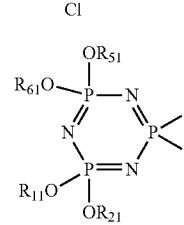

[Chemical Formula 4]

wherein in Chemical Formula 4, $R_{51}$ to $R_{61}$ are the same or different and are each independently hydrogen, methyl, ethyl, propyl, isopropyl, butyl, pentyl, hexyl or phenyl.

7. A molded article manufactured by the polycarbonate resin composition of claim 1.

8. The molded article of claim 7, wherein the molded article is an exterior material of a cellular phone.

* * * * *